United States Patent
Dethienne et al.

[11] Patent Number: 6,131,858
[45] Date of Patent: Oct. 17, 2000

[54] COMPACT SINGLE-PROPELLANT UNITARY PROPULSION SYSTEM FOR A SMALL SATELLITE

[75] Inventors: Nathalie Dethienne, Livry-sur-Seine; Xavier Pages, Dammarie-les-Lys, both of France

[73] Assignee: Societe Nationale d'Etude et de Construction deMoteurs d'Aviation, Paris, France

[21] Appl. No.: 09/121,783

[22] Filed: Jul. 23, 1998

[30] Foreign Application Priority Data

Jul. 25, 1997 [FR] France .................................. 97 09488

[51] Int. Cl.[7] .................................. F02K 9/60; B64G 1/40
[52] U.S. Cl. .................................. 244/172; 244/169
[58] Field of Search .................................. 244/169, 172, 244/173; 60/200.1

[56] References Cited

U.S. PATENT DOCUMENTS

| | | |
|---|---|---|
| 3,072,363 | 1/1963 | Baumann et al. . |
| 3,180,084 | 4/1965 | Meeks .................................. 244/172 X |
| 3,254,486 | 6/1966 | Kenny . |
| 3,471,106 | 10/1969 | Maes .................................. 244/169 |
| 4,880,187 | 11/1989 | Rourke et al. .................................. 244/172 |
| 5,779,195 | 7/1998 | Basuthakur et al. .................................. 244/172 X |

FOREIGN PATENT DOCUMENTS 2 283 390  3/1976  France .

OTHER PUBLICATIONS

Dethienne, et al., "Design and Development of Propulsion Subsystem for Small Satellite Applications", Second European Spacecraft Propulsion Conference, May 27–29, 1997, Noordwij, The Netherlands.

*Primary Examiner*—Robert P. Swiatek
*Attorney, Agent, or Firm*—Weingarten, Schurgin, Gagnebin & Hayes LLP

[57] ABSTRACT

A compact single-propellant unitary propulsion system for placing a satellite into an orbit and subsequently correcting the orbit so that the satellite is stabilized on three axes comprises a liquid propellant tank secured to a satellite platform and having a reinforced bottom wall with an outlet and filter element, a distribution block welded to the reinforced bottom wall, at least one filling/emptying value mounted on the distribution block, and a set of at least two thrusters mounted on the distribution block and fed directly from the distribution block without additional pipework. The set of at least two thrusters point substantially along the axis of the tank, which is aligned with the axis of the satellite. The propulsion system may be fully assembled before it is integrated with the satellite.

14 Claims, 5 Drawing Sheets

COMPACT SINGLE-PROPELLANT UNITARY PROPULSION SYSTEM FOR A SMALL SATELLITE

FIELD OF THE INVENTION

The present invention relates to a compact single-propellant unitary propulsion system for a small satellite that needs to make occasional corrections to its orbit.

PRIOR ART

Various types of propulsion system associated with satellites are known for putting them initially on station and for correcting their orbits.

Propulsion systems for small satellites make use of liquid propellant thrusters having one or more tanks connected by pipework that is welded or screwed to the thrusters and to other pieces of equipment such as stop valves, sensors, filling/emptying valves, filters, etc.

Such implementations are complex and require a large amount of time for assembling and integration, and they are expensive.

In a paper entitled "Design and development of propulsion subsystem for small satellite applications" given by Nathalie DETHIENNE and Nicolas CORNU during the "Second European Spacecraft Propulsion Conference" that took place at Noordwijk, Netherlands, May 27 to 29, 1997, a propulsion system for a small satellite was proposed in which the thrusters, together with associated elements such as filling/emptying valves, are mounted individually on a cylindro-conical structure which is itself fitted around the propellant tank and is fixed thereto. Such an implementation does not avoid using various items of linking pipework between the thrusters and the outlet orifice of the tank, and requires a cylindro-conical structure to be provided to cover a substantial portion of the tank, which means that assembly remains relatively complex and expensive.

OBJECT AND BRIEF SUMMARY OF THE INVENTION

An object of the invention is to remedy the drawbacks of existing propulsion systems, and in particular to reduce assembly and integration costs, and also to reduce the time required for such operations, and to make it possible to provide a compact independent propulsion system that is fully assembled before being integrated with the satellite platform, so that the number of interfaces between the satellite platform and the propulsion system can be greatly reduced.

According to the invention, these objects are achieved by a compact single-propellant unitary propulsion system for a small satellite, wherein the system comprises:

a) a liquid propellant tank fitted with means for fixing to the platform of the satellite, and including a reinforced bottom wall;
b) a distribution block welded to the reinforced bottom wall of the tank which includes a filter element;
c) at least one filling/emptying valve mounted on the distribution block; and
d) a set of at least two thrusters mounted on the distribution block, pointing substantially along the axis of the tank, itself corresponding to the axis of the satellite and fed directly from the distribution block without additional pipework.

The propulsion system may comprise a single valve for filling and emptying the tank with propellant or with cleaning, test, or pressurization fluid.

In another possible embodiment, the propulsion system comprises a first filling/emptying valve mounted on the distribution block and serving to fill and empty the tank with propellant, and a second filling/emptying valve mounted on the distribution block and serving to fill and empty the tank with gas, the second filling/emptying valve being connected via the distribution block to pipework inside the tank and extending to the end of the tank remote from the outlet adjacent to the distribution block.

Each thruster comprises a motor assembly fixed via a flange to a valve body itself fixed on the distribution block.

In a particular embodiment, the propulsion system comprises four thrusters disposed in a cross-configuration symmetrically about the axis of the tank.

In a particular embodiment, the distribution block comprises a first portion fixed to the bottom wall of the tank to receive the thrusters, and a second portion situated beneath the first portion to receive auxiliary equipment such as a filling/emptying valve or a pressure sensor.

Advantageously, the thrusters are bent through 90°, thereby simultaneously reducing the overall height and the height beneath the fixing means for the tank of the propulsion system.

In another particular embodiment, the distribution block comprises a support plate having the thrusters mounted on the bottom portion thereof.

Under such circumstances, the auxiliary equipment such as a filling/emptying valve or a pressure sensor may be disposed radially at the periphery of the support plate of the distribution block, or beneath the plate like the thrusters.

BRIEF DESCRIPTION OF THE DRAWINGS

Other characteristics and advantages of the invention appear from the following description of particular embodiments given as examples, with reference to the accompanying drawings, in which.

DETAILED DESCRIPTION OF PARTICULAR EMBODIMENTS

Figure 1:
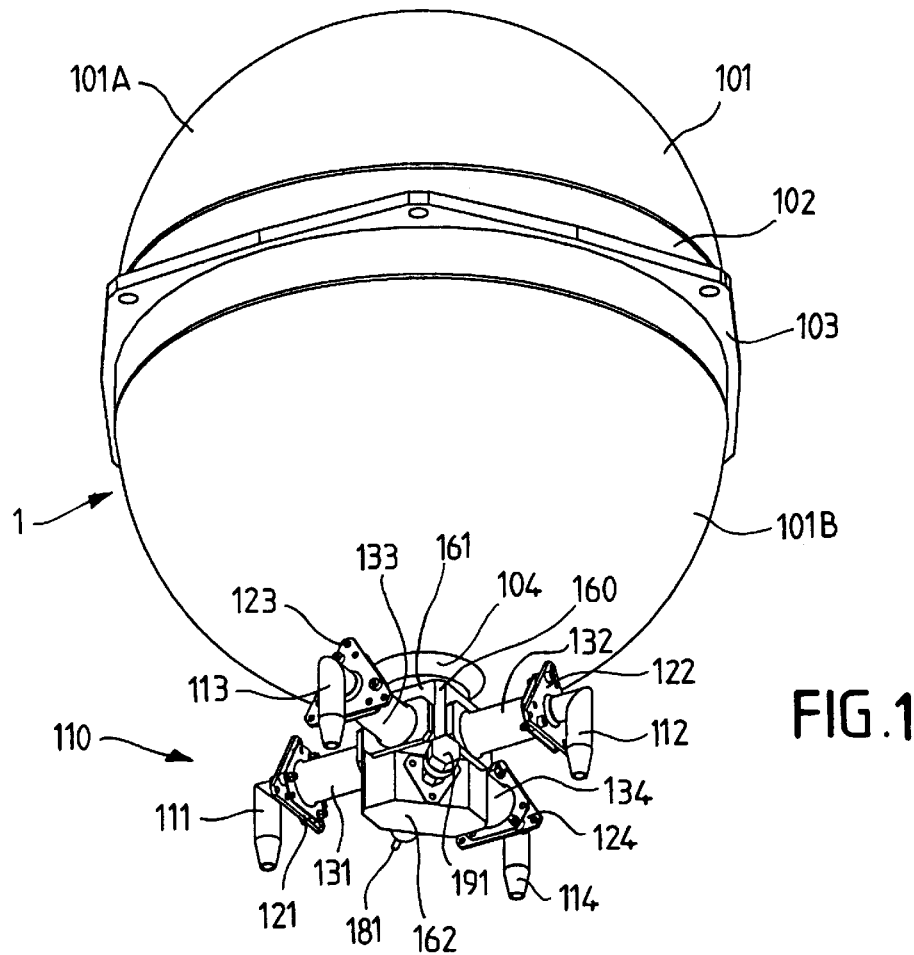
FIG. 1 is a perspective view of a propulsion system constituting a first embodiment of the invention.
Figure 2:
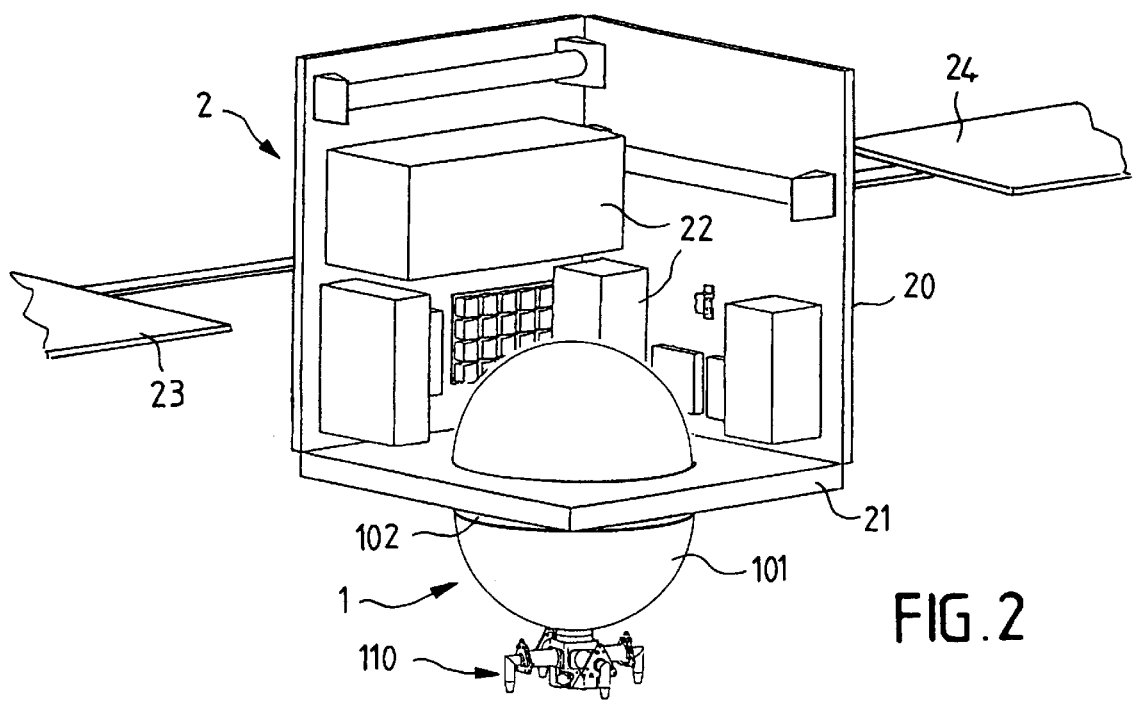
FIG. 2 is a partially cutaway diagrammatic view showing one way in which the propulsion system of the invention can be implemented on a small satellite.

FIG. 1 shows a first example of a compact single-propellant unitary propulsion system for fitting to a small satellite 2 as shown diagrammatically in FIG. 2.

The propulsion system is designed for initially placing a small satellite into an orbit and subsequently carrying out orbital corrections so that the small satellite is stabilized with respect to three axes. In particular, the invention can be applied to satellites having a mass of the order of 200 kg to 1000 kg. The propulsion system of the invention can thus be fitted to small satellites that are generally designed to be situated in low orbits. The propulsion system is used essentially for initially putting the satellite on station or for subsequently controlling its altitude, while other maneuvers such as correcting the attitude of the satellite are performed by means of inertia wheels. The propulsion system is constituted by thrusters whose thrust is directed essentially along the axis of the satellite 2, which also corresponds to the axis of the tank 101.

In FIG. 1, it can be seen that the propulsion system essentially comprises a tank 101 which is advantageously made entirely out of titanium and comprises two hemispheres 101A and 101B that are interconnected by a cylindrical bushing 102 on which equatorial fixing means 103 are mounted for securing the tank to a platform 21 (FIG. 2) of a satellite 2, which satellite essentially comprises a central module 20 housing various functional elements 22 thereof, plus solar panels 23, 24. The shape of the satellite 2 may naturally differ from that shown diagrammatically in FIG. 2, and it may include various items of equipment that are not shown, for example inertia wheels.

The tank 101 has a reinforced bottom wall 104 on which a distribution block 160 is welded, which block is also advantageously made out of titanium. In particular, titanium is compatible with a propellant such as hydrazine.

A set 110 of thrusters 111 to 114 is fixed directly to the distribution block 160 and is described below with reference to FIGS. 1, 3, and 4.

Figure 5:
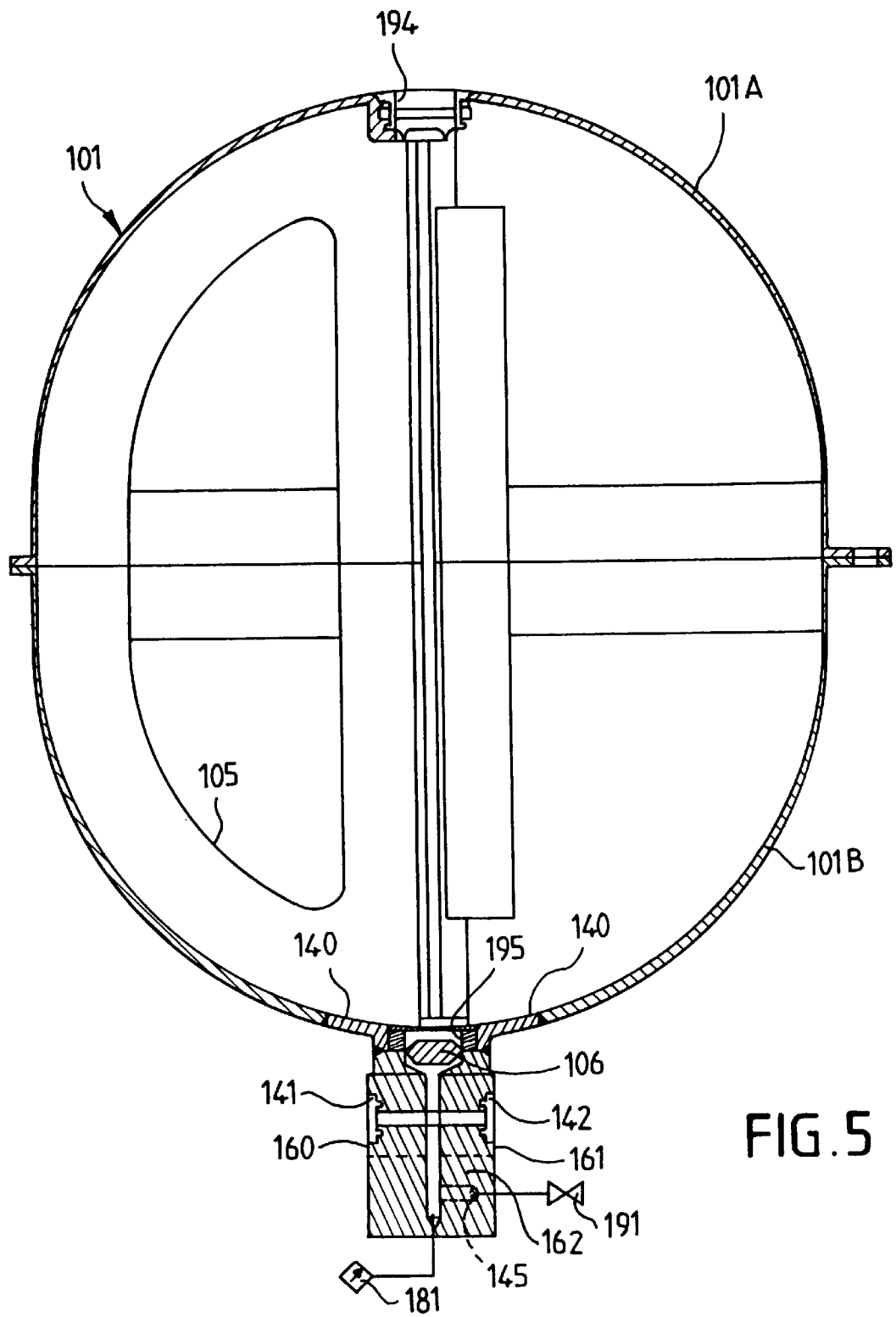
FIG. 5 is an axial section view showing details of a tank and of a distribution block associated with a single filling/emptying valve.
Figure 6:
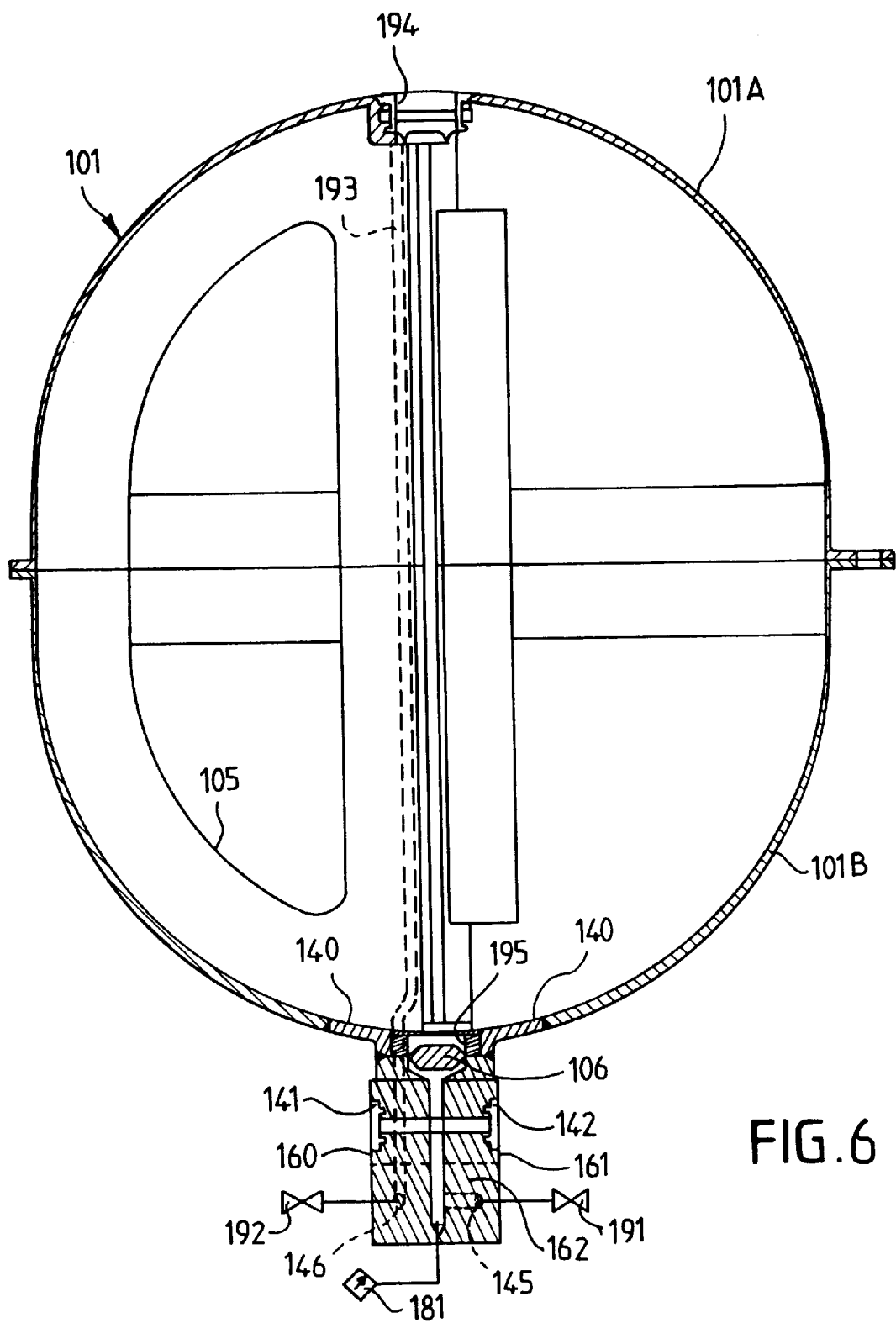
FIG. 6 is an axial section view showing details of a tank and a distribution block associated with two filling/emptying valves.

The tank 101 can be made in a wide variety of ways. By way of example, FIGS. 5 and 6 show a surface tension tank having a capacity of 40 dm$^3$ containing hydrazine pressurized with helium and operating at a pressure that drops from 22 bars to 5.5 bars as the volume of gas increases when the propellant is used up (with the tank being emptied in "blow down" mode). FIGS. 5 and 6 show a liquid expulsion device 105 having blades that serve to guarantee displacement of the propellant towards the outlet 195 of the tank by surface tension, whatever the position of the propellant in the tank. The blades of the liquid expulsion device 105 interconnect the inlet 194 and the outlet 195 of the tank. A filter 106 is integrated in the outlet 195 of the tank 101 and forms a barrier that is proof against the pressurization gas.

The reinforced bottom wall 104 of the tank may have extra thickness 140 (FIGS. 5 and 6) in the vicinity of the outlet 195 of the tank so as to be mechanically strong enough for the distribution block 160 to be connected thereto by welding, which block 60 is made as a solid piece with internal link channels between the outlet 195 from the tank 101 fitted with the filter 106 and orifices such as 141, 142 for feeding thrusters such as 111, 112, and an orifice 145 for feeding a filling/emptying valve 191.

When only one filling/emptying valve 191 is provided, the valve serves to fill and to empty the tank both with propellant or any other test or cleaning fluid, and also to pressurize and depressurize the tank 101 using helium or some other drying or test gas. When only one valve 191 is used, once the tank has been evacuated and filled with propellant with the tank in its normal position, the tank is pressurized via the same valve 191 by injecting gas, but only after the tank has been turned upside-down so that the liquid is remote from the outlet 195.

In another embodiment, as shown in FIG. 6, a second filling/emptying valve is installed on the distribution block 160. Under such circumstances, the first valve 191 connected to the orifice 145 is used for liquid only, while the second valve 192 connected to the orifice 146 is connected via the distribution block 160 and pipework 193 inside the tank 101 to the top end 194 of the tank 101. Under such circumstances, the procedure for filling and pressurizing the tank does not require it to be turned upside-down.

A pressure sensor 181 (FIG. 1) is installed on the distribution block 160 for use on the ground to control cleaning and pressurization operations and to proceed with leakage testing and proof pressure testing. In flight, the pressure sensor 181 can be used to monitor pressure variation and consequently to monitor the quantity of propellant that remains.

It will be observed that the invention, which is particularly characterized by implementing a distribution block 160 secured to a reinforced bottom wall 104 of the tank 101, can be applied to tanks of a wide variety of types, for example membrane or bladder tanks, that are optionally provided with pressurization means which may or may not be integrated in the tank. The shape and the size of the tank can also be adapted to requirements and may differ from the spherical or cylindro-spherical shape shown in the drawings.

Figure 3:
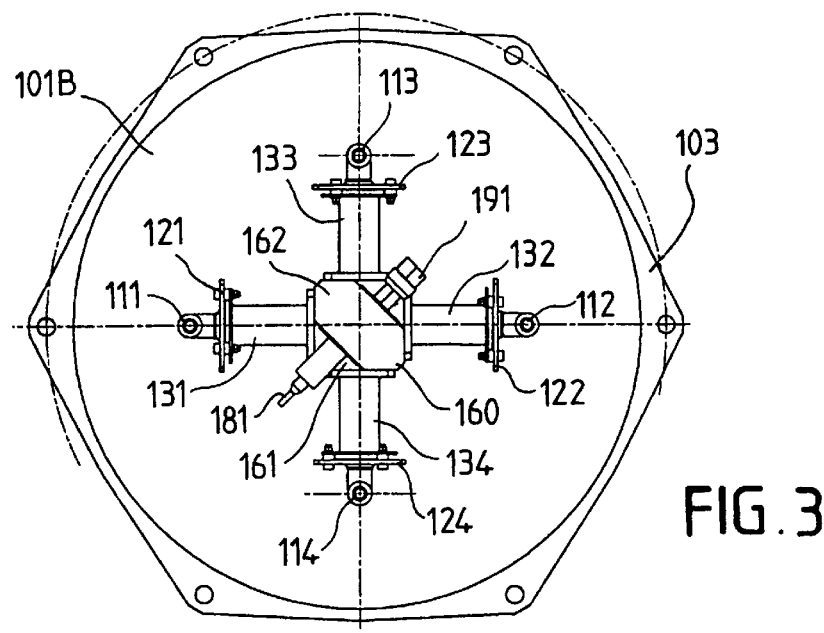
FIG. 3 is a view from beneath of the FIG. 1 propulsion system.
Figure 4:
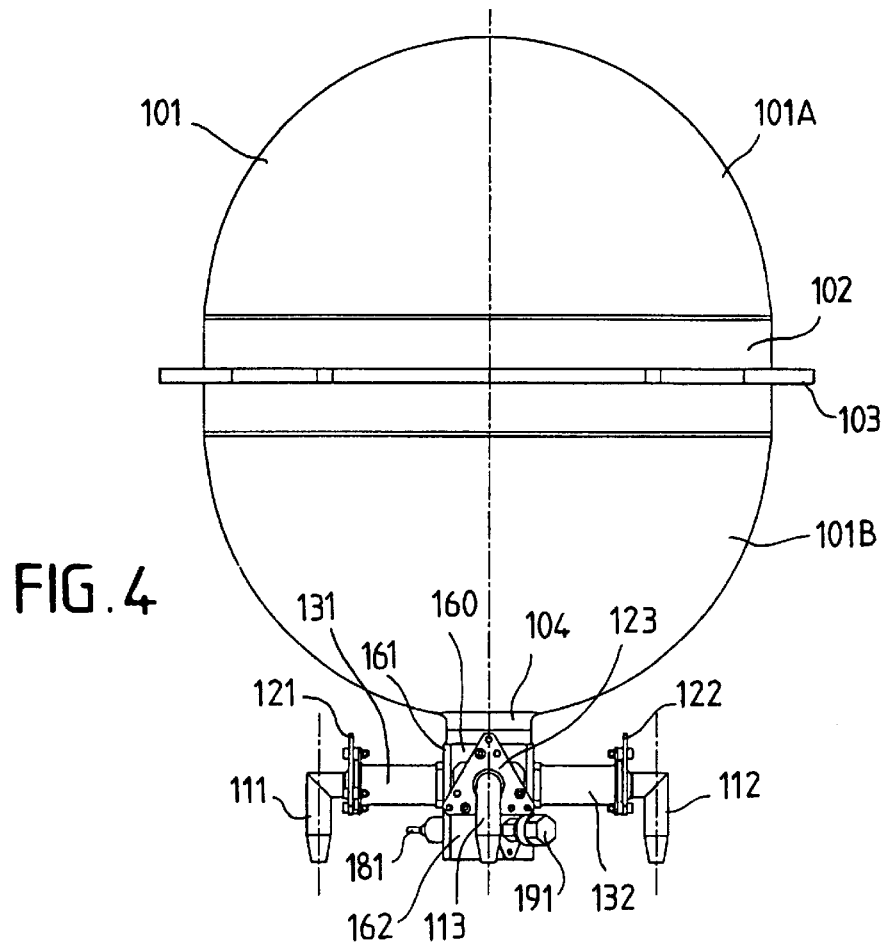
FIG. 4 is an elevation view of the FIG. 1 propulsion system.

FIGS. 1, 3, and 4 show a first example of how thrusters can be disposed on the distribution block 160.

In accordance with the invention, a set of at least two thrusters having thrust lying in the range about 0.2 N to 5 N is mounted on the distribution block, with the thrusters pointing substantially along the axis of the tank which corresponds to the axis of the satellite 2. The thruster are fed directly from the distribution block via the internal channels thereof, as mentioned above with reference to FIGS. 5 and 6, without using any additional external pipework. The thrusters are disposed symmetrically about the axis of the tank.

In FIGS. 1, 3, and 4, there can be seen a set 110 of four thrusters 111 to 114 disposed in a cross-configuration symmetrically about the axis of the tank.

In conventional manner, each thruster 111 to 114 comprises a motor proper constituted by a propellant injector, a combustion chamber fitted with a catalyst, and a nozzle. The motor 111 to 114 is itself connected via flanges 121 to 124 to a valve body 131 to 134 which advantageously comprises a set of two valves connected in series for providing the necessary safety and redundancy.

The valve body 131 to 134 is itself directly connected to the distribution block 160 without additional pipework.

In the embodiment of FIGS. 1, 3, and 4, the thrusters 111 to 114 have respective 90° bends. In preferred but non-limiting manner, each bend is formed level with the capillary tube constituting the propellant injector, a first portion of which is horizontally aligned with a valve body connected radially to the distribution block 160, and a second portion of which points downwards, essentially parallel to the axis of the tank 101, the combustion chamber and the nozzle themselves being in line with said second portion of the injector. In this way, the overall height of the propulsion system and the height beneath the fixing flange 103 of the propulsion system can be small. The assembly comprising the distribution block 160 and the set of thrusters 110 is smaller transversely than the diameter of the tank 101.

The propulsion system of the invention is unitary, compact, independent, and fully assembled before being integrated with the platform 21 of the satellite 2, and it is connected thereto via a single interface constituted by the link means 103.

The number of thrusters 111 to 114 can vary, e.g. in the range 2 to 8. The shape of the distribution block 160 can be adapted to the number of thrusters. Depending on the application, the positions and the spacing between the axes of the thrusters can vary. Thus, in some cases, it can be desirable for the distribution about the axis of the tank to be asymmetrical.

In the example of FIGS. 1, 3, and 4, there can be seen a distribution block 160 having two superposed stages. Thus, an upper portion 161 of essentially cubic shape with chamfered edges has four side faces, each having fitted thereto an assembly constituted by one of the thrusters 111 to 114 and the associated pair of valves 131 to 134. A lower portion 162 of the distribution block is of cubic or hexagonal shape having at least two main side faces that are advantageously offset by 45° from the side faces of the upper portion 161, and on which there are mounted a filling/emptying valve 191 and a pressure sensor 181. Accessibility to all of the elements of the propulsion system is then optimized and the mass of the distribution block assembly 160 can be as small as possible.

When two valves 191 and 192 are used, the lower portion 162 of the distribution block can be of cubic shape, offset by 45° relative to the upper portion 161, and the valves may, for example, be disposed on two faces of the lower portion 162 while the pressure sensor is disposed on a third main face of said lower portion 162.

It will be observed that the distribution block 160 could, in a variant, have only a single stage, being octagonal in shape so as to make it possible to install four thrusters and the associated equipment constituted by the valves or sensors all on the same level. However, such a configuration would not make it possible to have as small a distance between the axes of the thrusters as is possible in the embodiment of FIGS. 1, 3, and 4. If the set of thrusters has only two thrusters, e.g. the thrusters 111 and 112, then a valve 191 and a pressure sensor 181 can easily be disposed at the same level as the thrusters 111 and 112, on those faces of the cubic portion 161 of the distribution block 160 that are occupied by the thrusters 113 and 114 in the above-described four-thruster embodiment. In a two-thruster embodiment, the second portion 162 of the distribution 160 can then be omitted in order to reduce mass.

Figure 7:
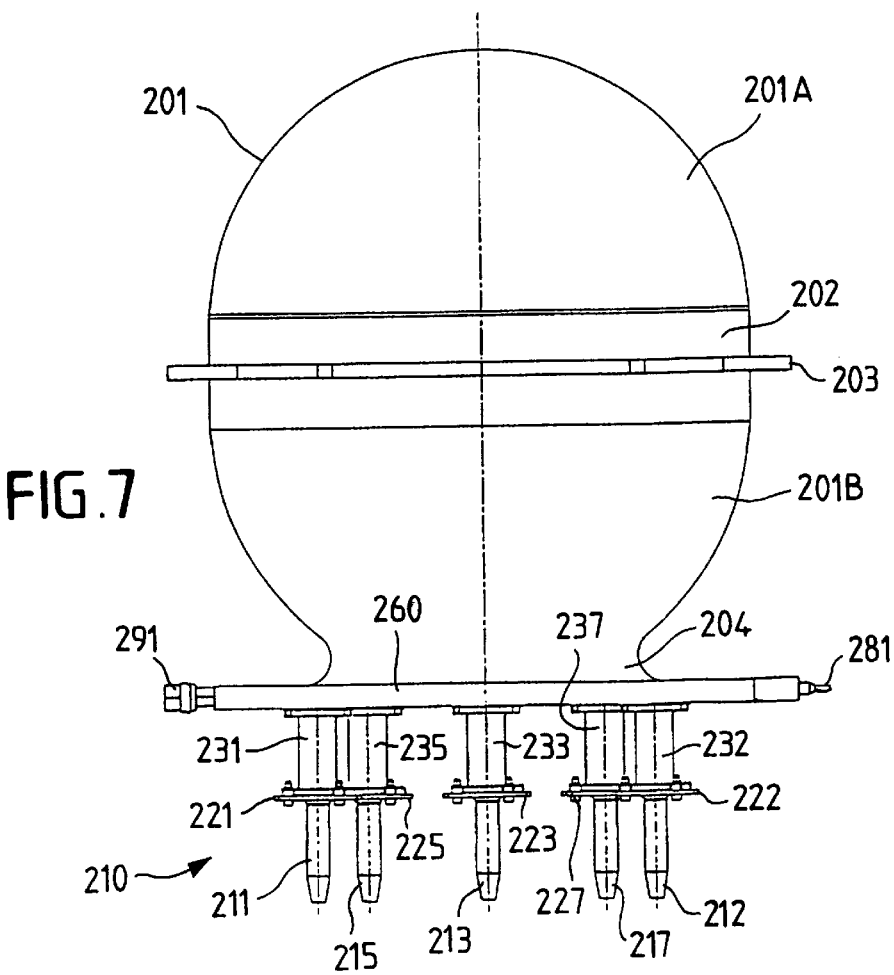
FIGS. 7 and 8 are respectively an elevation view and a view from beneath of a propulsion system constituting a second embodiment of the invention.
Figure 8:
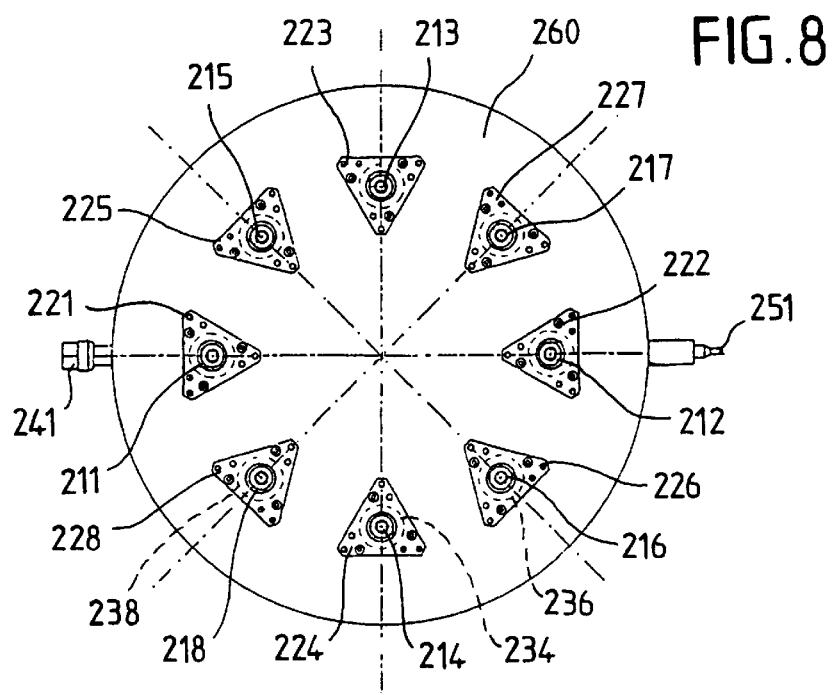

FIGS. 7 and 8 show another embodiment of the invention, in which the tank 201 made up of the hemispherical portions 201A and 201B plus the bushing 202 fitted with fastening means 203 for fastening to the platform of a satellite can be similar to the above-described tank 101. In FIGS. 7 and 8, the reinforced bottom wall 204 of the tank is nevertheless of larger area in order to receive a distribution block 260 in the form of a support plate or slab having a single stage, e.g. in the form of a disk, whose outside diameter can be equal to or slightly less than the diameter of the tank 201.

In the embodiment of FIGS. 7 and 8, the set 210 of thrusters 211 to 218 is fitted to the bottom face of the plate of the distribution block 260. The thrusters 211 to 218, eight thrusters in this example, are regularly distributed around a circle centered on the axis of the tank, but other configurations or distributions are possible.

Each of the thrusters 211 to 218 is constituted by a rectilinear motor proper constituted by an injector, a catalyst combustion chamber, and a nozzle, the motor proper being connected via a flange 221 to 228 to a valve body 231 to 238 housing two valves in series and connected to the bottom face of the support plate of the distribution block 260 within which there are formed the channels for feeding the valves 231 to 238 from the outlet of the tank 201 which may be fitted with a filter as in the embodiments described above. In the embodiment of FIGS. 7 and 8, the thrusters 211 to 218 are in alignment with the corresponding valve bodies 231 to 238 which extend downwards substantially parallel to the axis of the tank 201.

A pressure sensor 281 and a filling/emptying valve 291 (or where appropriate two filling/emptying valves) perform the functions described above with reference to the embodiments of FIGS. 1 to 6, and can be disposed, for example, in a radial configuration, being fitted to the edge of the support plate of the distribution block 260.

The embodiment of FIGS. 7 to 8 provides ease of assembly both for the set 210 of thrusters and for the auxiliary equipment onto the distribution block 260, and for assembly of the propulsion system as a whole onto the platform 21 of a satellite 2 such as that shown in FIG. 2.

Naturally, various modifications and variants can be provided to the embodiments described. Thus, for example, in the embodiment of FIGS. 7 and 8, the auxiliary equipment 281, 291 can also be mounted on the bottom face of the support plate 260 like the thrusters 211 to 218.

What is claimed is:

1. A compact single-propellant unitary propulsion system for a small satellite, wherein the system comprises:

a) a liquid propellant tank fitted with means for securing the tank to the satellite, and including a reinforced bottom wall;

b) a distribution block welded to the reinforced bottom wall of the tank, the reinforced bottom wall including an outlet adjacent to the distribution block and a filter element integrated in the outlet;

c) at least one filling/emptying valve mounted on the distribution block; and d) a set of at least two thrusters mounted on the distribution block, pointing substantially along the axis of the tank, itself corresponding to the axis of the satellite and fed directly from the distribution block without additional pipework.

2. A propulsion system according to claim 1, comprising a single valve for filling and emptying the tank with propellant or with cleaning, test, or pressurization fluid.

3. A propulsion system according to claim 1, comprising a first filling/emptying valve mounted on the distribution block and serving to fill and empty the tank with propellant, and a second filling/emptying valve mounted on the distribution block and serving to fill and empty the tank with gas, the second filling/emptying valve being connected via the distribution block to pipework inside the tank and extending to the end of the tank remote from the outlet adjacent to the distribution block.

4. A propulsion system according to claim 1, wherein each thruster comprises a motor assembly fixed via a flange to a valve body itself fixed on the distribution block.

5. A propulsion system according to claim 1, comprising four thrusters disposed in a cross-configuration symmetrically about the axis of the tank.

6. A propulsion system according to claim 1, wherein the distribution block comprises a first portion fixed to the bottom wall of the tank to receive the thrusters, and a second portion situated beneath the first portion to receive auxiliary equipment such as a filling/emptying valve or a pressure sensor.

7. A propulsion system according to claim 1, wherein the thrusters are bent through 90°.

8. A propulsion system according to claim 1, wherein the distribution block comprises a support plate having the thrusters mounted on the bottom portion thereof.

9. A propulsion system according to claim 8, wherein auxiliary equipment means is disposed radially at the periphery of the support plate of the distribution block.

10. A propulsion system according to claim 9, wherein said auxiliary equipment means comprises a filling/emptying valve.

11. A propulsion system according to claim 9, wherein said auxiliary equipment means comprises a pressure sensor.

12. A propulsion system according to claim 8, wherein auxiliary equipment means is mounted on the bottom face of the support plate of the distribution block.

13. A propulsion system according to claim 12, wherein said auxiliary equipment means comprises a filling/emptying valve.

14. A propulsion system according to claim 12, wherein said auxiliary equipment means comprises a pressure sensor.

* * * * *